United States Patent [19]

Fryer et al.

[11] 3,879,708

[45] Apr. 22, 1975

[54] APPARATUS FOR ASSESSING QUALITIES OF RECORDED CHARACTERS

[75] Inventors: Paul Raymond Fryer, Melksham; Walter Robert Throssell, Hitchin, both of England

[73] Assignee: International Computers Limited, Hertfordshire, England

[22] Filed: July 16, 1973

[21] Appl. No.: 379,833

Related U.S. Application Data

[63] Continuation-in-part of Ser. No. 190,729, Aug. 20, 1971, abandoned.

[30] Foreign Application Priority Data

July 1, 1971 United Kingdom............... 30849/71

[52] U.S. Cl............. 340/146.3 AG; 340/146.3 Q; 340/146.3 MA

[51] Int. Cl. ............................................ G06k 9/12

[58] Field of Search........ 340/146.3 MA, 146.3 AG, 340/146.3 R, 146.3 F, 146.3 Q

[56] References Cited

UNITED STATES PATENTS

| | | | |
|---|---|---|---|
| 3,104,369 | 9/1963 | Rabinow et al. | 340/146.3 AG |
| 3,303,466 | 2/1967 | Holt | 340/146.3 MA |
| 3,492,470 | 1/1970 | Gorbatenko | 340/146.3 Q |

*Primary Examiner*—Gareth D. Shaw
*Assistant Examiner*—Leo H. Boudreau
*Attorney, Agent, or Firm*—Hane, Baxley & Spiecens

[57] ABSTRACT

Apparatus for assessting the quality of printed characters on a record has a document support arranged beneath a scanning head. The scanning head has a lens arranged to oscillate in a direction parallel to the vertical axis of characters printed on the document. The lens is arranged to focus a character to be evaluated on to a set of photoelectic strips arranged side-by-side in a direction perpendicular to the oscillatory movement of the lens, so that a character image is scanned in vertical strips. The lens moving arrangement also has a timing pulse generator so that the character scan is broken into notional zones which, in conjunction with the orientation of the photoelectric strips enables a matrix representation of the recorded character to be generated. The separate output signals from the photoelectric strips are passed to shifting registers whose stages are connected to a storage matrix capable of selecting an idealised character form to be compared with the scanned character. The comparison is carried out over a number of scanning cycles while the position of the document carrying the character is changed and an indication is provided of the least deviation of the scanned character from the idealised character form during the change.

1 Claim, 2 Drawing Figures

APPARATUS FOR ASSESSING QUALITIES OF RECORDED CHARACTERS

This application is a continuation-in-part application based on our copending application Ser. No. 190,729 filed Aug. 20, 1971, now abandoned.

BACKGROUND OF THE INVENTION

1. FIELD OF THE INVENTION

The present invention relates to apparatus for qualitatively assessing characters recorded on a document.

2. DESCRIPTION OF THE PRIOR ART

It has previously been proposed to provide apparatus, for example, data processing apparatus, in which input data is derived by sensing characters recorded on documents. In such apparatus, which may, for example, include optical character recognition devices, it is essential that recorded characters meet certain quality criteria in order that the characters may be unambiguously recognised by the character sensing arrangements. It is desirable, therefore, that means be provided for assessing the qualities possessed by recorded characters in order to determine whether such characters meet the appropriate criteria.

SUMMARY OF THE INVENTION

According to the present invention, apparatus for checking the characteristics of a character recorded in an area of a document includes means operable to scan the record area to derive a numerical representation of the character; means storing a standard numerical representation of the character; means for comparing the derived representation with the standard representation to produce a signal indicative of the extent of agreement of the derived representation with the standard representation; means for translating the character within the scanned area during a succession of scanning operations while repeatedly performing the comparison, successive indicative signals being produced. during the succession of operations according to variation in agreement of the compared representations in the different operations; means for deriving from said successive signals a final signal indicative of the closest agreement of the compared representations and means responsive to said final signal to produce a visual display for the benefit of a human operator indicative of the degree of excellence of the recorded character.

In order to distinguish between the known character recognition apparatus and the present apparatus which is concerned with evaluating the qualities of recorded characters, it is useful to consider the known recognition systems in detail. Thus, the recognition systems essentially need to look at a character presented to them, and to compare some features found in the presented character with features of all the characters of a given repertoire in order to decide which of the repertoire characters the presented character most nearly resembles. Thus, two operations performed may be categorised as "looking" and "comparing."

It is to be noted that the present application also requires the performance of looking and comparing operations, but, however, in the present case the recorded character must be known and the comparing operation is not to find which of a font the recorded character must resembles, but to determine how far from a prescribed standard the character form has departed. In order better to appreciate the need for the present evaluation apparatus it is proposed briefly to review some of the problems involved in recognising characters. Firstly, apparatus can only distinguish one character from the others of the font if there can be specified for each character a unique combination of features. Clearly the larger the font, the more difficult it becomes to specify distinguishing features, so that the distinctions as between any one character and another are the more slender. This is true where the features of characters of the font are within the control of the system designer, and where some features of characters may be exaggerated, for example, to provide additional distinctions. It is clear, then that the problem becomes much more difficult when the characters are varied in size, or are produced by different recording apparatus, or are characters from fonts having slight differences, or are recorded on different recording surfaces. All these things can seriously impair the ability of a character recognition system to deal with specific characters produced by specific recorders on specific materials. The purpose of the present "print quality evaluator" or "monitors" is to enable the likely performance of a character recorded under specified conditions to be judged, before the character, or its recording process, or the material of the record, for example, are committed for use in a recognition system. Since the apparatus to be described indicates departure from a notional ideal character it will be apparent that a "score" of zero could be expected from a character whose form corresponds exactly to that which is specified as a standard; a character whose size matches the size of the standard and which is recorded with a prescribed density on a record having a prescribed reflectance. Even given the required parameters, however, the wrong placement of an ideal character in the scanned area will prevent the indication of a zero "score." Thus the position of the character within the scanned area is preferably modified to ensure that the resultant score is not biassed by wrong placement. Hence, the score actually obtained is independent of position. It is also advantageous that the threshold of the scanning cells is adjustable so that the final score may be independent of recording density and record surface to enable the features of the character outline alone to be judged. To this end, the character is repeatedly scanned while the position and threshold parameters may be varied and an indication is provided of the lowest score registered. It will thus be seen that it does not matter that displacement from the ideal position to one or more other positions will increase the score; the indicated lowest score will still reflect the nearest that the recorded character has come to the predetermined standard set for the character, and this indicated score will still be a measure of the suitability of the recorded character for use in a recognition system based on the standard.

BRIEF DESCRIPTION OF THE DRAWING

Apparatus embodying the present invention will now be described, by way of example, with reference to the accompanying drawings, in which.

DESCRIPTION OF THE PREFERRED EMBODIMENT

Figure 1:
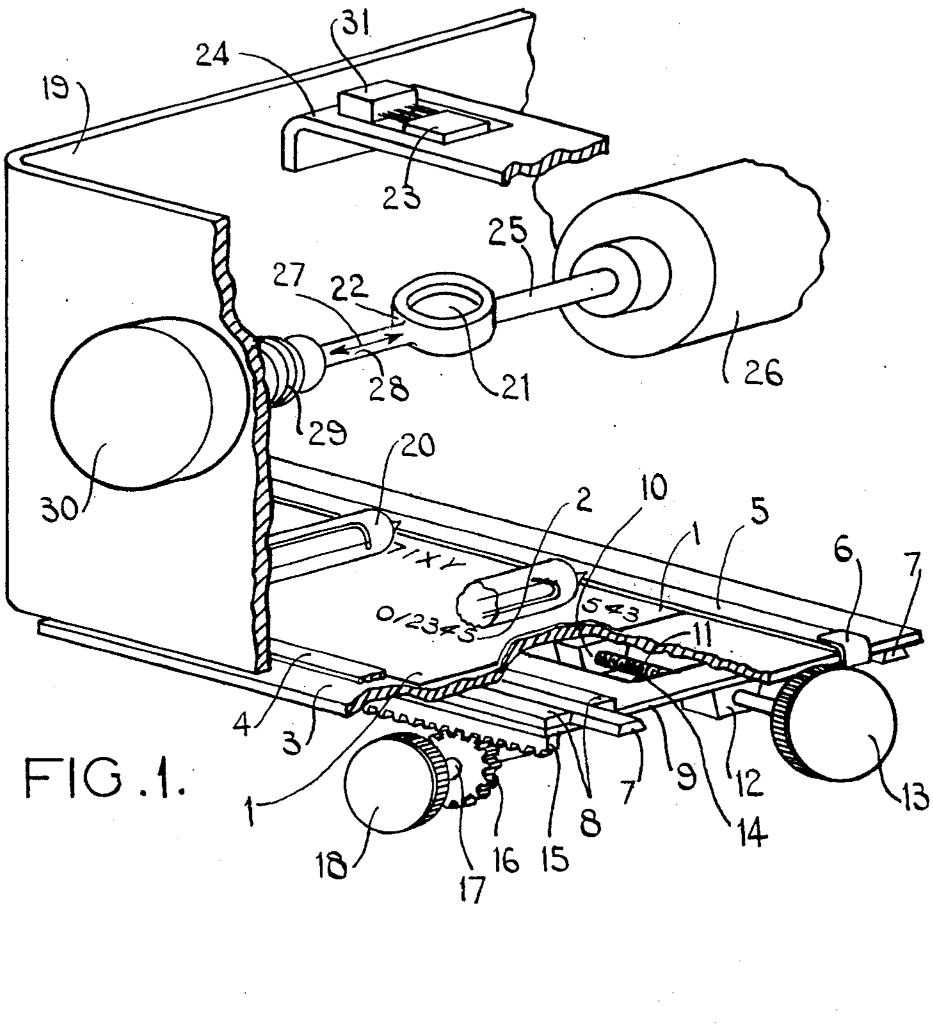
FIG. 1 is an explanatory drawing of the mechanical elements of a character scanning arrangement and, FIG. 2 is a schematic block diagram of character comparison arrangements for use with the apparatus of FIG. 1.

Referring now to FIG. 1, a document 1 carries characters 2 to be scanned. The document 1 is supported by a bed plate 3 having a reference strip 4 to form an abutment for one edge of the document 1. The strip 4 thus provides a means for locating the document on the plate 3. The opposite edge of the document to that abutting the strip 3 is held by a flexible clamping strip 5 which is held to the bed plate 3 by means of clips 6 at each end. In order to vary the position at which the document may be located, the strip 4 is preferably positionably adjustable on the plate 3.

The bed plate 3 is supported for movement in a direction parallel to the length of the strip 4 by slides 7 secured to the plate 3 which are slidably engaged with slideways 8 carried by a base 9. A threaded block 10 is secured to the underside of the plate 3 and is engaged with a lead screw 11. The lead screw 11 is supported in bearing blocks, such as 12, secured to the base 9 and projects beyond the base 9. A handwheel 13 is provided to turn the lead screw 11 so that in response to the rotation of the lead screw 11 the plate 3 may move relative to the base 9 in the direction of the screw 11, an aperture 14 being provided in the base 9 to permit a corresponding movement of the block 10.

The base 9 is also supported by slides (not shown) to permit it to move in the same direction as the plate 3. A rack 15 secured to the underside of the base 9 is meshed with a pinion 16 secured to a shaft 17 which also carries a handwheel 18. Thus, the handwheel 18 provides for a coarse adjustment of the position of the plate 3 and the handwheel 13 provides for fine positional adjustment. The base 9 and plate 3 assembly is positioned beneath a scanning arrangement carried by a main frame 19. The frame 19 carries a pair of line filament lamps 20 to illuminate that area of the document 1 beneath the scanning arrangement. The scanning arrangement includes a lens 21 carried in a holder 22 above the document 1 and a photoelectric detector 23 supported in a cross-member 24 above the lens holder 22.

The lens holder 22 is secured to the operating shaft 25 of a vibrator unit 26. Operation of the vibration unit produces an oscillation of the lens holder 22 at right angles to the direction of relative movement of the base 9 and plate 3, as indicated by arrow 27. An arm 28 extends from the lens holder 22 in line with the shaft 25, and a coil assembly 29 is mounted about the arm 28. The coil assembly projects into a magnet assembly (not shown in detail) housed within a cover 30 and supported on the main frame 19. Connections are provided from the coil assembly 29 and in response to the oscillation of the lens holder, these connections carry output signals induced by the relative motion between the coil assembly and the magnet assembly to indicate the velocity at any instant of the lens assembly.

The photoelectric detector 23 consists of a group of ten light sensitive square cells arranged in line side-by-side, the line extending in a direction perpendicular to the direction of oscillation of the lens 21. The lens 21 is positioned so that the detector 23 and a selected one of the characters 2 on the document are in conjugate planes. Connections to the strips are provided by a terminal block 31 mounted on the cross member 24.

In operation a document bearing characters to be analysed is placed on the plate 3 and clamped by the strip 5. The alignment strip 4 is positioned on the plate so that a line of characters, such as the characters 2, is at right angles to the direction of oscillation of the lens 21 and is so positioned relative to the lens and photoelectric sensing cells 23 that the movement of the lens effectively scans over the complete outline of a character and progressively brings sequential zones of the character outline into view on the cells. A particular one of the characters 2 in the line is brought to the character scanning position by movement of the plate 3 in response to rotation of the handwheels 13 and 18. The selected character is illuminated by the lamps 20. Thus, the scanning of a character may be regarded in the present example as including the notional division of the character into ten adjacent vertical strips, one character strip being associated respectively with each of the light sensitive cells forming the photoelectric detector 23. The movement of the lens 21 then permits the scanning of a succession of zones in each of these vertical strips, and the output signal from the coil 29 permits the output signals from the detector 23 to be strobed to produce sampling signals at predetermined points in the scan. It will be appreciated that if the movement of the lens 21 were at a constant velocity, the provision of sampling signals at a constant frequency would result in a scan in which equally spaced vertical zones of the character would be examined in turn. However, the vibrator unit 26 actually produces a harmonic motion of the lens 21 and it is therefore convenient to use the coil signal to control a clock generator so that the sampling signals are produced at a varying frequency in order to provide equally-spaced vertical zones.

Figure 2:
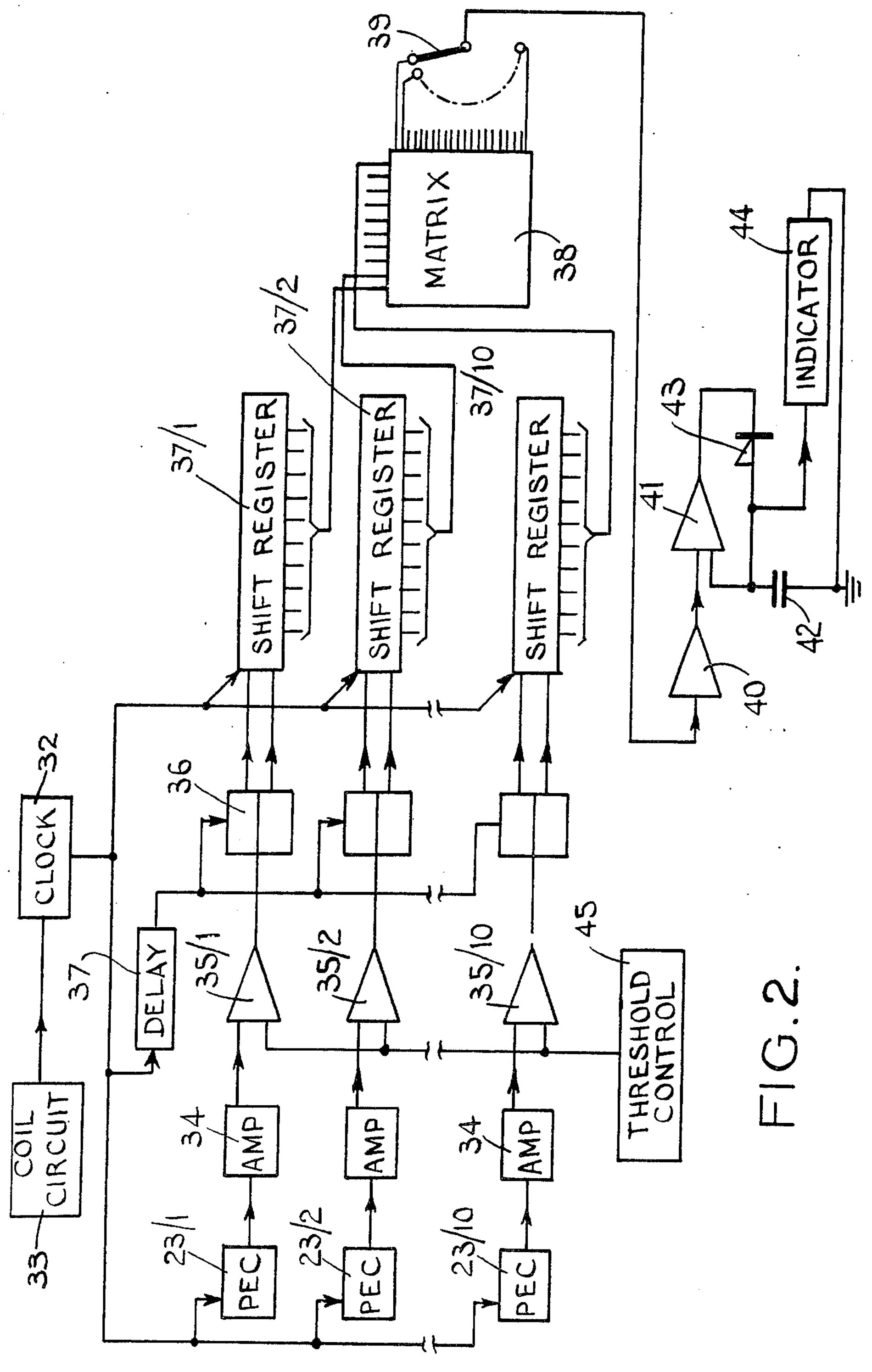

The scanning arrangements are shown in schematic form in FIG. 2. A clock generator 32 is controlled by signals derived from a coil output circuit 33, which receives the output signals from the coil (FIG. 1). Resulting sampling commands from the clock generator 32 (FIG. 2) are applied to the individual cells 23/1 to 23/10 of the photoelectric detector 23. For the sake of clarity only three cells 23/1; 23/2 and 23/10 are shown in the Figure. The sampled outputs from the cells 23/1 to 23/10 are each applied through an associated amplifier 34 and the amplified outputs are respectively applied each to an associated one of a group of comparator amplifiers 35/1 to 35/10. The comparators 35 are all connected to a threshold level selector 45. The selector 45 provides a reference level voltage which is adjustable to provide a predetermined sensitivity adjustment between a notional "black" and "white" in order to enable variations in the reflectance of the document and the density of the ink forming the character to be taken into account.

The cells 23 are operated in an integrating mode in which the voltage output at any time after the sample command is proportional to the light intensity-time interval. Thus, the output from the cells 23 and hence from the amplifiers 34 will vary with time at a rate depending on the light intensity at the particular cell 23.

Each of the comparators 35 will therefore provide a step output when the output level of its associated amplifier 34 exceeds the reference level, and the timing of the occurrence of the step will depend upon the reflectance of that zone of the character strip currently being scanned.

The output of each comparator 35 is applied to an associated bistable stage 36 which also receives an input from a common delay unit 37 which is, in turn, fed from the clock generator. The delay unit 37 effectively delays the clock signals to provide a strobing timing pulse. This strobing pulse is applied to the bistable stages 36 to permit each stage 36 to be set if the associated summing amplifier output step occurs before the strobing pulse or to remain unset if the step output has occurred after the strobing pulse. The set and unset states may be regarded as notional binary one and zero representations respectively and these output representations are applied from the bistable stages 36 to the input stages of a group of shift registers 37/1 to 37/10, one for each of the bistable stages 36 respectively. The shift registers 37 are supplied with shift control pulses from the clock generator 32.

Each shift register has at least as many steps as there are notional zones in the scan of a character. Thus, for example, let it be supposed that there are ten zones. Then, each character scanning movement of the lens 21 (FIG. 1) can be notionally divided into ten periods and the clock generator 32 (FIG. 2) then provides ten sampling pulses for the photosensitive strips 23/1 to 23/10 plus one additional pulse to permit the last of the successive binary representations from the bistable stages 36 to be entered into the shift registers 37. At the end of this succession of pulses the shift registers 37 will each contain a binary coded representation of all the zones in a single strip of the character and the registers 37 will therefore together all contain a binary coded representation of the complete character as scanned by a single movement of the lens 21 (FIG. 1). This representation may be considered as a 10 × 10 cellular matrix of 100 cells with the cells containing, say, binary ones indicating black character areas and binary zeros representing areas of white background, for example. It will also be understood that the character area may be notionally divided into smaller areas to provide a greater precision in character representation by using a larger number of photosensitive strips in the detector 23 and by providing for a larger number of sampling periods during a single scanning movement of the lens 23. Thus, for example, in a practical case it has been found that a twenty-period scan produces a satisfactory character representation.

In practice, the scanning movement of the lens is arranged to cover more than the height of a character and there will thus be more scan periods, or zones, than are necessary to cover a character. By the end of a scanning movement, the binary representation of the character strip in a shift register may well, in this case, have partly been shifted out of the register. However, as will be clear from the following description this does not affect the operation of the remainder of the apparatus.

Outputs from the stages of the shift registers 37 (FIG. 2) are applied to a resistor matrix 38. In its simplest form, the matrix 38 has a column for each separate shift register stage. Thus if there are ten shift registers 37 each with twenty stages, there will be two hundred columns in the resistor matrix. Each column of the matrix will be associated with a number of rows of resistors, one row for each character that may be scanned. Thus if only the numeral characters 0 to 9 be considered, then there will be ten rows in the matrix and each row will be coupled by resistors to the column lines of the matrix to represent an ideal form of the row character. The row lines of the matrix are selected by a character selector switch 39, the switch being arranged to couple a chosen character row to an output scanning amplifier 40. The resistor matrix 38 is arranged so that if the signals representing the character pattern applied to the matrix from the shift registers 37 represent the ideal form of the character, there will be no resultant output from the matrix to the amplifier 40. However, if the character pattern represented by the contents of the shift registers 37 is not identical to the pattern of an ideal character, then there will be an output signal from the matrix 38 to the amplifier 40, and the magnitude of the output signal will be proportional to the deviation of the registered pattern from the ideal, and may be regarded as an indication of magnitude of error present in the scanned character.

In a second, preferred form, the resistor matrix 38 has a pair of rows of resistors for each stage, one row being connected from columns which are to be interpreted as black in the selected character and the other row containing resistors connected to those columns which are to be white. Thus, it will be seen that anyone of the two hundred cells may be considered as requiring to be black or white respectively in dependence upon which row of the pair contains a connected resistor. Equally, it will be seen that by omitting the resistor connection from both rows of the pair, a particular cell may be given no particular significance at all. In this form of apparatus, the matrix 38 is actually a pair of minor matrices, one for black areas of a character and the other for white areas, and the selector switch 39 is arranged to select both minor matrices for each character. In this preferred form of apparatus, it will be realised that the amplifier 40 actually consists of a pair of summing amplifiers, one for each minor matrix, and the outputs of this pair of amplifiers are connected to a difference amplifier whose output is connected as will be described for the output of the amplifier 40 shown.

As shown, the output from the amplifier 40 is applied to a second summing amplifier 41, and is represented as a positive going signal of a magnitude proportional to the error in the scanned character pattern. A second input to the summing amplifier 41 is connected to one side of a capacitor 42, the other side of which is grounded or otherwise connected to a neutral supply rail. This second input to the amplifier 41 is so connected that the amplifier 41 is sensitive to relatively negative excursions of the input connection, and the input is also connected through a diode 43 to the output connection of the amplifier 41. An indicator, such as a sensitive voltmeter, is connected across the capacitor 42, and it is preferred, for ease of operation and accuracy of indication, to use a digital voltmeter for this indictor.

The connection of the capacitor/diode circuit is so arranged that for any character scanning operation the charge remaining on the capacitor 42 at the end of the operation will be proportional to the smallest error registered during the operation, and the indicator will register the voltage across the capacitor at that state of charge. Hence, it will be realised that the indicator must be chosen so that it does not significantly discharge the capacitor 42 during the period required for scanning and reading the indicator.

The operation of the arrangement described in order to assess the acceptability of a character recorded on a document is carried out by first selecting the character to be assessed on the document. The character selector switch 39 is then set to select the matrix row or rows corresponding to the chosen character. The document 1 is positioned on the plate 3 (FIG. 1) and the plate 3 is then positioned so that the areas occupied by the chosen character is approximately aligned with the area scanned by the lens 21. The threshold control 45 is adjusted to suit the background reflectance of the document and the clarity of the character to be assessed. The character area is then scanned by operation of the vibrator 26 and the consequent movement of the lens 21 and the binary-coded character representation is entered into the shift registers 37 (FIG. 2).

The representation is compared with the ideal character representation in the matrix 38 and an error signal is produced and applied to the amplifier 41, the error being indicated by the indicator 44. The position of the plate 3 (FIG. 1) is adjusted by means of the fine adjustment handwheel 13 until the indicator 44 (FIG. 2) shows a minimum deflection. The indicator may be arbitrarily calibrated to indicate whether or not the scanned character is acceptable.

It will be realised that the number of characters in the available assessment repertoire may be increased by the provision of more rows in the matrix 38 and a corresponding increase in the capacity of the selecting switch 39.

In the preferred form of apparatus, in which the lens scans an area greater in height than the character, it will be realised that it is not necessary for the character to be positioned in a static predetermined position beneath the scanning head, for the arrangement for indicating minimum error will permit the character to be assessed provided that its entire outline is passed through the scanned area and that it is not skewed. Thus, in actual operation, the document 1 is positioned on the plate so that movement of the fine handwheel 13, after initial coarse positioning under control of the handwheel 18, will move the character to be assessed slowly through the scanned area. Thus, this form of apparatus does not require the provision of accurate guides or jigs; it is sufficient merely to move the character outline across the scanned area during its assessment, and the minimum error indication arrangement will register the error at the time when the "best fit" of the character outline to the selected character standard is obtained. Hence, even the vertical positioning of the document is required to be no more accurate than the tolerance permitted by the height of the scanning area relative to the character height. A scanning area height of approximately twice the height of a character has been found adequate. At the same time it will also be realised that instead of providing for vertical adjustment of character position by making the guide 4 adjustable (in order to scan different lines of characters on the document 1, for example) it may be preferred to add the facility for movement of the bed plate 3 in a direction parallel to the direction of movement of the scanning lens.

It will be realised that, in practice, provision is made for resetting the circuits after assessment of one character has been completed and prior to the assessment of a new character. Thus, the capacitor 42 associated with the indicator 44 is reset to a voltage level equivalent to a maximum error signal. The shift register 37 and bistable stages 36 may also be reset, although in practice it has been found that this latter resetting is not necessary, since new information derived from scanning a new character will displace the information from the previously scanned character. Resetting is performed by a manually-operated switch (not shown) on a control panel associated with the apparatus.

The vibrator unit 26 is a commercially available unit chosen to provide a movement equal to the required scan area height. It is convenient to drive the vibrator unit 26 from a normal A.C. supply main, so that the frequency of vibration is governed by the A.C. supply frequency. It will be realised, however, that a scanning rate of this frequency is not essential for the operation of the apparatus.

We claim:

1. Apparatus for matching characteristics of a printed character with a preferred standard form of that character to evaluate the suitability of the printed character for use in a character recognition system, including scanning means arranged to scan in a single operation a predetermined planar area, the area being of greater extent than is required to contain the character;

means for supporting a document carrying the printed character in a position in which the character is in the plane of but not lying wholly within said area;

means operable to move the document along a path such that the character lies within the area throughout at least a part of the path, the movement permitting scanning of the entire character, the scanning being arranged during movement of the document repeatedly to scan the area in a succession of scanning operations to derive a first signal representing for each operation those parts of the character scanned during that operation;

a character store containing representations of preferred standard forms of a plurality of characters;

means operable to select from the store the standard form representation of the printed character to derive a second signal;

comparing means responsive to said first and said second signals to generate an output whose magnitude is proportional for each complete scanning operation to the degree of divergence of the scanned portion of the printed character from the standard form;

a signal storage device responsive to the output from each successive scanning operation such that a stored signal is changed only if the magnitude of the current output is less than the least of the outputs from preceding scanning operations, whereby the stored signal at the end of the succession of scanning operations has a magnitude proportional to the least deviation of the printed character from the standard form during the succession; and means responsive to the stored signal to produce a visual indication of said least deviation under the best possible match conditions occurring during the succession.

* * * * *